March 25, 1924.  
W. J. A. LONDON  
POWER TRANSMITTING MECHANISM  
Filed March 13, 1922
1,488,358
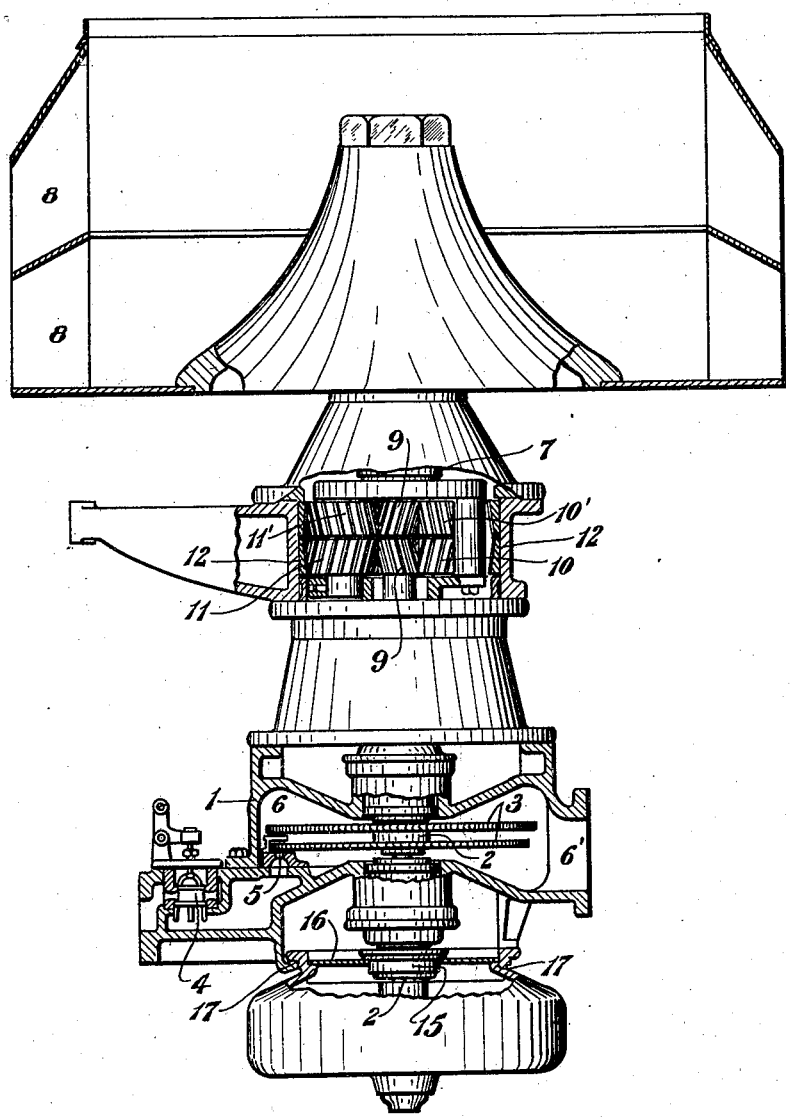
INVENTOR,  
William J. A. London,  
BY Harry W. Bowen.  
ATTORNEY.

Patented Mar. 25, 1924.

1,488,358

UNITED STATES PATENT OFFICE.

WILLIAM J. A. LONDON, OF SPRINGFIELD, MASSACHUSETTS.

POWER-TRANSMITTING MECHANISM.

Application filed March 13, 1922. Serial No. 543,179.

*To all whom it may concern:*

Be it known that I, WILLIAM J. A. LONDON, a subject of the King of Great Britain, residing at Springfield, in the county of Hampden and Commonwealth of Massachusetts, have invented certain new and useful Improvements in Power-Transmitting Mechanism, of which the following is a specification.

This invention relates to improvements in power transmitting mechanisms in which planetary or other suitable kinds of gearing is employed between the driving and driven parts.

An object of the invention is to provide a device for constantly maintaining the teeth of the driving and driven gear wheels in correct contacting relation.

My invention, broadly considered, consists in supporting or mounting a bearing box of one of the shafts on a flexible, elastic, or yieldable support in order to automatically permit longitudinal or axial movement of that shaft during its rotative movements, whereby correct tooth pressure between the teeth of the gear wheels is accurately as well as automatically taken care of.

The invention is particularly adapted for use in an apparatus that is driven by a steam turbine where a reduction of speed is necessary between the driving shaft of the turbine and the driven shaft, as for example, in driving a fan or screw propeller, where the efficiency of operation of the fan or propeller depends upon a definite rate of rotation and that is materially lower than that of the turbine. I attain these objects by the mechanism illustrated in the accompanying drawings, in which the single figure shown is a vertical longitudinal sectional view through the axis of a turbine device fan operating set with a planetary gearing device to furnish speed at the fan which is lower than that at the turbine and showing the yieldable mounting for a bearing of the shaft of the turbine.

The invention is understood to be applicable to constructions in which the driving and driven shafts are arranged in either a horizontal or vertical position. In the view shown the shafts are arranged in a vertical position.

Referring to the drawings in detail; 1 designates the enclosing casing, 2 the shaft of the steam turbine to which the moving blade or wheel 3 is secured; 4 is the steam inlet or throttle valve, 5 the nozzle through which the steam passes to the turbine blades in the steam chamber or casing 6, and which escapes through the exhaust opening 6'. 7 designates the shaft which carries the fan blades 8. 9 is the pinion on the rapidly revolving turbine shaft 2; 10, 11, 10' and 11' are the planet gears which mesh with the pinion 9 and fixed ring 12. The gears, it will be observed, are of the herring-bone type. The fixed ring 12 operates as a reaction or stationary device against which the planet wheels operate to cause the driven fan shaft 7 to revolve in the same direction as the turbine shaft 2, but at a lower rate of rotation. 15 designates a suitable bearing box for supporting the lower end of the turbine shaft 2. This box in turn is mounted, or supported on the center portion of the flexible or elastic plate or disc 16, the edge of which rests on the casing part 17. It will be seen, therefore, that the elastic plate 16 will readily permit the bearing box 15 to move vertically or axially and also the shaft 2 which it supports. This movement of the shaft 2 permits the teeth of the gears 9, 10, 11, 10' and 11' to automatically position themselves with relation to each other.

It is obvious that the elastic and flexible plate 16 may be made up or composed of a series of thin plates instead of one single plate, without departing from the spirit and scope of my invention.

What I claim is:

1. In a power transmission device, the combination, of a driving shaft, a driven shaft, planetary gearing mechanisms connecting the shafts the gear teeth of which are of the herring-bone type; flexible means connected to the driving shaft whereby that shaft may yield and move axially thereof, and the contact surfaces of the teeth of the gearing mechanism will automatically adjust themselves to produce the correct or uniform tooth pressure between the teeth of the driving and driven shafts for efficient operation.

2. In combination with a driving member, a bearing box for said member, a driven member, herring-bone gear devices connecting said members, a flexible device for mounting the bearing box of the driving member to permit the driving member to move axially and to permit the contact surfaces of the teeth of the gear devices to automatically adjust themselves for equalizing the pressure between the teeth for efficient operation of the driving and driven members.

3. In a power transmitting device, the combination, of driving and driven members, a bearing box for mounting one end of the driving member, a flexible plate on which the box is located to permit axial movement thereof, said plate being secured to a fixed support at or near the outer edge of the plate.

4. A mounting for a rotative member to permit axial movement thereof, said mounting comprising a flexible plate, a bearing secured thereto and in which the member is mounted the plate being supported at its edges.

5. A power transmitting device, comprising, in combination, driving and driven members, herring-bone gearing connecting the same, a device for supporting one of the members for providing axial movement thereof for allowing the contacting surfaces of the teeth of the gearing to automatically adjust themselves with relation to each other for providing the proper clearance or tooth space between the teeth, as described.

6. A planetary gearing power transmitting device, comprising in combination, driving and driven members, herring-bone gear teeth in said gearing for connecting the members, a bearing box for supporting the driven member, and means including a flexible member for supporting the box to permit both of the members to move axially with relation to each other to allow the teeth of the gearing to automatically adjust themselves, whereby correct tooth space between the teeth of the gears is provided.

WILLIAM J. A. LONDON.